US008650089B2

(12) United States Patent
Laster-Fields

(10) Patent No.: US 8,650,089 B2
(45) Date of Patent: Feb. 11, 2014

(54) SYSTEMS AND METHODS FOR PROVIDING DYNAMIC CONTENT INTO A STATIC ELECTRONIC DOCUMENT

(76) Inventor: Gina Laster-Fields, Lisle, IL (US)

( * ) Notice: Subject to any disclaimer, the term of this patent is extended or adjusted under 35 U.S.C. 154(b) by 50 days.

(21) Appl. No.: 13/150,853

(22) Filed: Jun. 1, 2011

(65) Prior Publication Data
US 2012/0310775 A1 Dec. 6, 2012

(51) Int. Cl.
*G06Q 30/00* (2012.01)
(52) U.S. Cl.
USPC .......................................... 705/26.1
(58) Field of Classification Search
USPC .......................................... 705/26.1
See application file for complete search history.

(56) References Cited

U.S. PATENT DOCUMENTS

2006/0170670 A1* 8/2006 Burke ........................... 345/418
2007/0239533 A1* 10/2007 Wojcicki et al. ................ 705/14
2012/0130819 A1* 5/2012 Willcock et al. .......... 705/14.66

\* cited by examiner

Primary Examiner — Mila Airapetian
(74) Attorney, Agent, or Firm — Dinsmore & Shohl

(57) ABSTRACT

Included are systems and methods for providing dynamic content into a static electronic document. At least one embodiment includes receiving an indication to include the dynamic content into the static electronic document, creating a computer program that defines functionality of the dynamic content, and deploying the computer program into the static electronic document. Similarly, some embodiments include sending the static electronic document to a user computing device, where at least a first portion of the static electronic document is configured to be viewed as a locally stored document and at least a second portion of the static electronic document receives the dynamic content from a remote computing device and receiving a request to provide the dynamic content, the request being provided in response to a user selection of a predetermined area of interest in the static electronic document. Still some embodiments include providing the dynamic content to the user computing device, wherein upon receipt of the dynamic content, the computer program causes the dynamic content to be provided within the predetermined area of interest in the static electronic document.

20 Claims, 15 Drawing Sheets

FIG. 10

SYSTEMS AND METHODS FOR PROVIDING DYNAMIC CONTENT INTO A STATIC ELECTRONIC DOCUMENT

BACKGROUND

As the computing age continues to develop and evolve, users desire more and more data in electronic form. As an example, instead of reading newspapers, many users now read online versions of the publications. Many users also access web logs, read magazines online, and even make many of their product purchases online. While in the past, much of this content has come in the form of static textual data, now internet data is not so limited. Imagery, video, and audio are now also easily accessible and provided in these online versions of publications. However, a problem with providing online versions of these publications is that much of the look and feel of the physical documents is lost when viewing online content. The users may receive similar data, but do not experience content in the same manner. Additionally, advertising and many other revenue generating functionalities are lost with online content.

SUMMARY

Included are systems and methods for providing dynamic content into a static electronic document. At least one embodiment includes receiving an indication to include the dynamic content into the static electronic document, creating a computer program that defines functionality of the dynamic content, and deploying the computer program into the static electronic document. Similarly, some embodiments include sending the static electronic document to a user computing device, where at least a first portion of the static electronic document is configured to be viewed as a locally stored document and at least a second portion of the static electronic document receives the dynamic content from a remote computing device and receiving a request to provide the dynamic content, the request being provided in response to a user selection of a predetermined area of interest in the static electronic document. Still some embodiments include providing the dynamic content to the user computing device, wherein upon receipt of the dynamic content, the computer program causes the dynamic content to be provided within the predetermined area of interest in the static electronic document.

Similarly, embodiments of a system include a memory component that stores logic that causes a remote computing device to create the static electronic document of a publication, receive an indication to include the dynamic content into the static electronic document, and create a computer program that defines functionality of the dynamic content. Additionally, the logic may further cause the remote computing device to deploy the computer program into the static electronic document, send the static electronic document to a user computing device, where at least a first portion of the static electronic document is configured to be viewed as a locally stored document and at least a second portion of the static electronic document receives the dynamic content from the remote computing device, and receive a request to provide the dynamic content, the request being provided in response to a user selection of a predetermined area of interest in the static electronic document. In still some embodiments, the logic causes the remote computing device to provide the dynamic content to the user computing device, wherein upon receipt of the dynamic content, the computer program causes the dynamic content to be provided within the predetermined area of interest in the static electronic document.

Similarly, embodiments of a non-transitory computer-readable medium includes logic that when executed by a computing device causes a computing device to create the static electronic document of a publication, receive an indication to include the dynamic content into the static electronic document, and create a computer program that defines functionality of the dynamic content. In some embodiments the logic causes the computing device to deploy the computer program into the static electronic document, send the static electronic document to a user computing device, where at least a first portion of the static electronic document is configured to be viewed as a locally stored document and at least a second portion of the static electronic document receives the dynamic content from the remote computing device, and receive a request to provide the dynamic content, the request being provided in response to a user selection of a predetermined area of interest in the static electronic document. In still some embodiments, the logic causes the computing device to provide the dynamic content to the user computing device, wherein upon receipt of the dynamic content, the computer program causes the dynamic content to be provided within the predetermined area of interest in the static electronic document.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 10 depicts a user interface for providing dynamic reservation options, according to embodiments disclosed herein;

DETAILED DESCRIPTION

Figure 1:
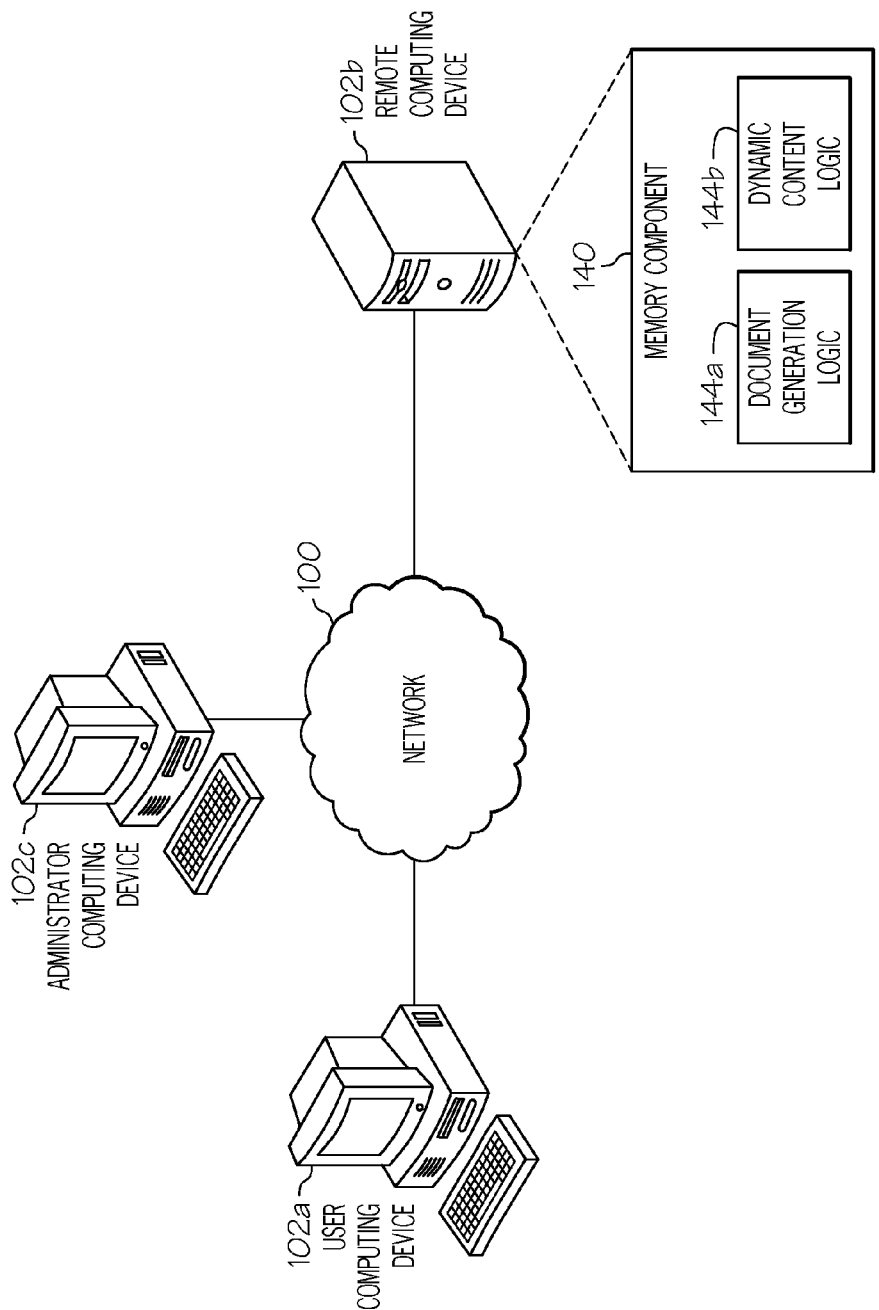
FIG. 1 depicts a computing environment for providing dynamic content in a static electronic document, according to embodiments disclosed herein.

Embodiments disclosed herein include a system and/or method for providing dynamic content in a static electronic document. In some embodiments, a static electronic document is a replica of a paper-based printed publication, such as a magazine, a newspaper, a brochure, a pamphlet, a sales slick, a manual, an encyclopedia, an atlas, a book, etc. As such, the static electronic document is configured to be displayed with the look and feel as the printed publication. At least a first portion of the static electronic document is configured to be viewed as a locally stored document (on a user computing device) and at least a second portion of the static electronic document receives dynamic content from a remote computing device. Because the static electronic document is intended for consumption on the user computing device, the static electronic document functions as a software application. Despite being run from the user computing device, embodiments disclosed herein retrieve images, video, audio, full-blown interactive applications, and/or other dynamic content into the locally stored static electronic document. Thus the actual size of the static electronic document can be very small.

In some embodiments, the dynamic content appears in free-floating windows rather than embedded on the page, so the reader can control how and where the information is displayed at all times. This means that users can move, minimize, maximize, close and re-open these content windows at will, making it possible to continue to display content windows from other pages, even after turning past that page. Thus, the static electronic document can incorporate a wide variety of dynamic content in the publication that would simply not be possible with print. Additionally, depending on the particular embodiment, the static electronic document may include menus, floating windows, checkboxes, radio buttons, etc., and may even support custom-designed computer programs such as widgets. The computer programs may include widgets for news, sports, traffic, weather, local information, up-to-the-minute changes to the article, extensible markup language (XML) feeds, really simple syndication (RSS) feeds, tickers, social media data, blogs, vlogs, web cams, business timelines, business calculators, animated charts and graphs, positioning, mapping, audio jukeboxes, video jukeboxes, video walls, video games, video game portals, etc. Similarly, some embodiments may be configured to launch external applications, such as spreadsheet applications, word processing applications, media player applications, etc.

Embodiments disclosed herein can be applied to just about any traditionally printed publication, from magazines to text books, technical manuals, even encyclopedias and atlases. Any form of documentation, including resumes, brochures, depositions, dossiers, and reports can be utilized according to the embodiments disclosed herein. Additionally, embodiments disclosed herein are extremely intuitive to use and may be much faster than traditional web browsing because unlike reading in a browser, the static electronic document resides on the user computing device. Where web pages require bandwidth to build quickly, embodiments disclosed herein utilize the memory component of the user computing device to build, so pages are provided much faster. Additionally, some embodiments include a bookmark bar option to give readers fingertip access to the table of contents from any page in the publication. Some embodiments include "go to page" feature that automatically navigates to the desired page.

In some embodiments, most if not all the dynamic content resides on a remote computing device, such as a server or group of servers that is centrally maintained. As such, there is little to no risk of a user being confronted with undesirable popup ads. Each page presents as a page of a publication. Because embodiments are designed from the finished digital files used for print-based publishing, publishers can continue to graphically design their documents as before, using the same software and design methodologies that have served well for print. But by converting digital files to the form disclosed herein, the publishers may be able to deliver online publications that look and feel like print-based documents but possess a functionality that makes the publications easier to consume, more enjoyable to read, and include additional dynamic content.

In some embodiments, the dynamic content may take the form of a smart advertisement. Initially, the reader is presented with a static advertisement on the static electronic document. The static advertisement is similar to advertisements that have always been associated with print advertising, so vendors still maintain the ability to advertise as in the past, even if readers completely bypass the smart advertisement. However, to fully utilize a smart advertisement, readers may opt-in to receiving dynamic content by selecting a predetermined area of interest in the proximity of the static advertisement, such as on the name of the product or manufacturer.

Similarly, in some embodiments, the smart advertisement may include a "piggy-back" advertisement. As an example, if a musical artist purchases an advertisement within the static electronic document, the musical artist may then offer advertisement space to third parties. If the third party is a vendor of the shirt that the musical artist wears in the advertisement, then a smart advertisement may be associated with the image of the shirt in the advertisement. Upon selecting the image of the shirt, the user may be provided with dynamic content provided by the vendor.

Smart advertisements may be configured as software applications that allow readers to watch video, listen to audio, tune in to internet radio stations, play games, blog, chat, shop, etc. As discussed in more detail below, user can utilize smart advertisements and other dynamic content to make hotel reservations, order concert tickets, etc. from the pages of the static electronic document. Depending on the content, a user could conceivably interact indefinitely with the dynamic content within the static electronic document, making it possible for advertisers and content designers to create truly engaging applications and presentations that keep readers involved with the ad content for hours rather than just minutes or a few seconds.

Similarly, some embodiments are configured to provide content linking functionality. The content linking functionality may be provided as a predetermined area of interest in the proximity of an article in the static electronic document. The linking functionality may be configured as a single word or block of text that is similar in function to a hyperlink. However, instead of navigating to a website or an alternate page within the same document, the content linking functionality can be used to launch a wide variety of interactive dynamic content such as movies, video galleries, image galleries and/or other interactive presentations that relate to the article.

Referring now to the drawings, FIG. 1 depicts a computing environment for providing dynamic content in a static electronic document, according to embodiments disclosed herein. As illustrated in FIG. 1, a network 100 may include a wide area network, such as the Internet, a local area network (LAN), a mobile communications network, a public service telephone network (PSTN) and/or other network and may be coupled to a user computing device 102a, remote computing device 102b, and an administrator computing device 102c.

Additionally, the user computing device 102a may include a memory component 140 that stores document generation logic 144a. The document generation logic 144a may be configured to provide functionality related to the generation of a static electronic document that includes dynamic content, as described herein. The memory component 140 also stores dynamic content logic 144b for creating the computer programs that provide the dynamic content within the static electronic document.

It should be understood that while the user computing device 102a and the remote computing device 102b are depicted as a mobile computing device and server respectively, these are merely examples. In some embodiments any type of computing device (e.g. mobile computing device, personal computer, server, etc.) may be utilized for either of these components. Additionally, while each of these computing devices 102a, 102b, 102c is illustrated in FIG. 1 as a single piece of hardware, this is also an example. Each of the computing devices 102a, 102b, 102c depicted in FIG. 1 may represent a plurality of computers, servers, databases, etc.

It should also be understood that while the document generation logic 144a and the dynamic content logic 144b are depicted in FIG. 1 as residing within the remote computing device 102b, this is just an example. In some embodiments, the user computing device 102a and/or the administrator computing device 102c may include this and/or similar logical components.

Figure 2:
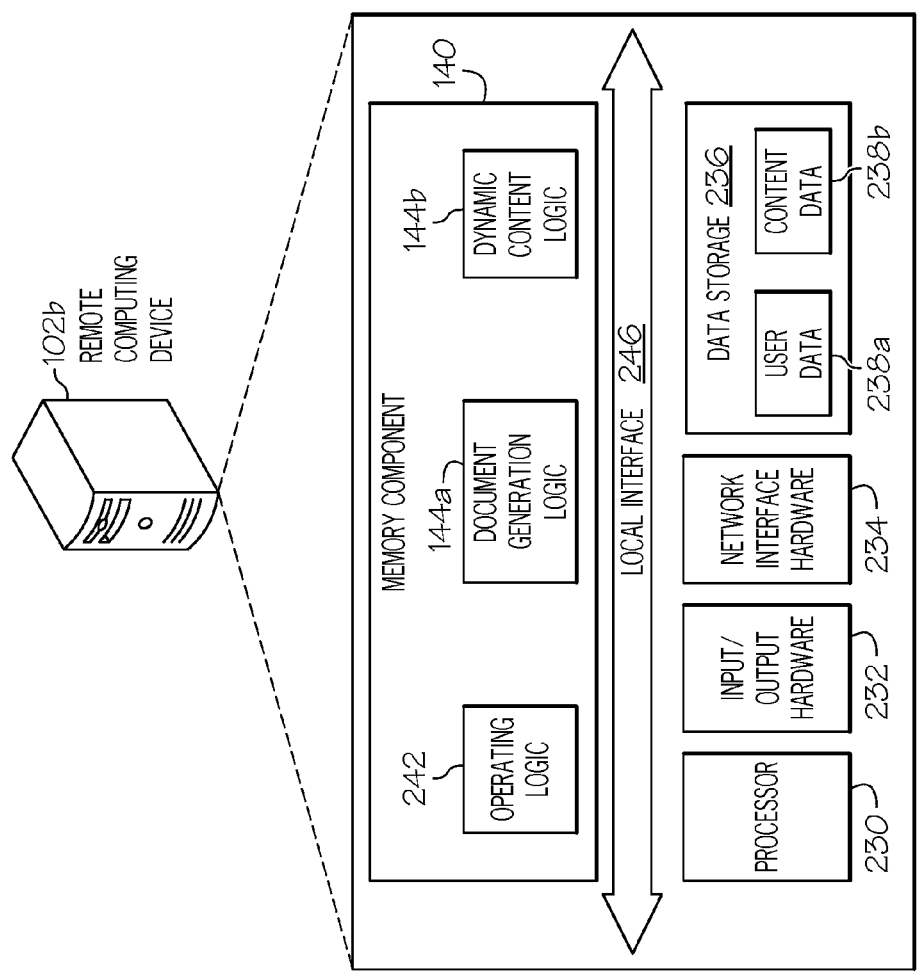
FIG. 2 depicts a computing architecture for providing dynamic content in a static electronic document, according to embodiments disclosed herein.

FIG. 2 depicts a computing architecture for providing dynamic content in a static document, according to embodiments disclosed herein. In the illustrated embodiment, the remote computing device 102b includes at least one processor 230, input/output hardware 232, network interface hardware 234, a data storage component 236 (which includes product data 238a, user data 238b, and/or other data), and the memory component 140. The memory component 140 may be configured as volatile and/or nonvolatile memory and, as such, may include random access memory (including SRAM, DRAM, and/or other types of RAM), flash memory, secure digital (SD) memory, registers, compact discs (CD), digital video discs (DVD), and/or other types of non-transitory computer-readable mediums. Depending on the particular embodiment, these non-transitory computer-readable mediums may reside within the remote computing device 102b and/or external to the remote computing device 102b.

Additionally, the memory component 140 may be configured to store operating logic 242, the document generation logic 144a, and the dynamic content logic 144b. The operating logic 242 may include an operating system, basic input output system (BIOS), and/or other hardware, software, and/or firmware for operating the remote computing device 102b. The document generation logic 144a and the dynamic content logic 144b may each include a plurality of different pieces of logic, each of which may be embodied as a computer program, firmware, and/or hardware, as an example. A local interface 246 is also included in FIG. 2 and may be implemented as a bus or other interface to facilitate communication among the components of the remote computing device 102b.

As discussed in more detail below, the document generation logic 144a may be configured to generate the static electronic document. The document generation logic 144a may include a plurality of modules and/or programs for creating static content, such as text and images, as well as pointers to computer programs (such as widgets) that provide dynamic content. The dynamic content logic 144b, by contrast is configured to create (e.g. automatically and/or with the assistance of a programmer) the computer programs that provide the dynamic content. Once the static electronic document and computer programs are created, the static electronic document may be sent to the user computing device 102a (FIG. 1). Depending on the particular embodiment, the computer programs that provide the dynamic content may also be sent to the user computing device 102a. Consequently, upon opening the static electronic document and accessing an area of predetermined interest, the computer program may execute to retrieve the dynamic content.

The processor 230 may include any processing component operable to receive and execute instructions (such as from the data storage component 236 and/or memory component 140). The input/output hardware 232 may include and/or be configured to interface with a monitor, positioning system, keyboard, mouse, printer, image capture device, microphone, speaker, gyroscope, accelerometer, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the remote computing device 102b and other computing devices. The processor 230 may also include and/or be coupled to a graphical processing unit (GPU).

It should be understood that the components illustrated in FIG. 2 are merely exemplary and are not intended to limit the scope of this disclosure. As an example, while the components in FIG. 2 are illustrated as residing within the remote computing device 102b, this is merely an example. In some embodiments, one or more of the components may reside external to the remote computing device 102b. It should also be understood that, while the remote computing device 102b in FIG. 2 is illustrated as a single device, this is also merely an example. Depending on the particular embodiment, the remote computing device may 102b be configured as a plurality of different components, which include a web server, a media server, etc.

Similarly, in some embodiments, the document generation logic 144a and the dynamic content logic 144b may reside on different devices. Additionally, while the remote computing device 102*b* is illustrated with the document generation logic 144*a* and the dynamic content logic 144*b* as separate logical components, this is also as an example. In some embodiments, a single piece of logic may perform the described functionality.

Figure 3:
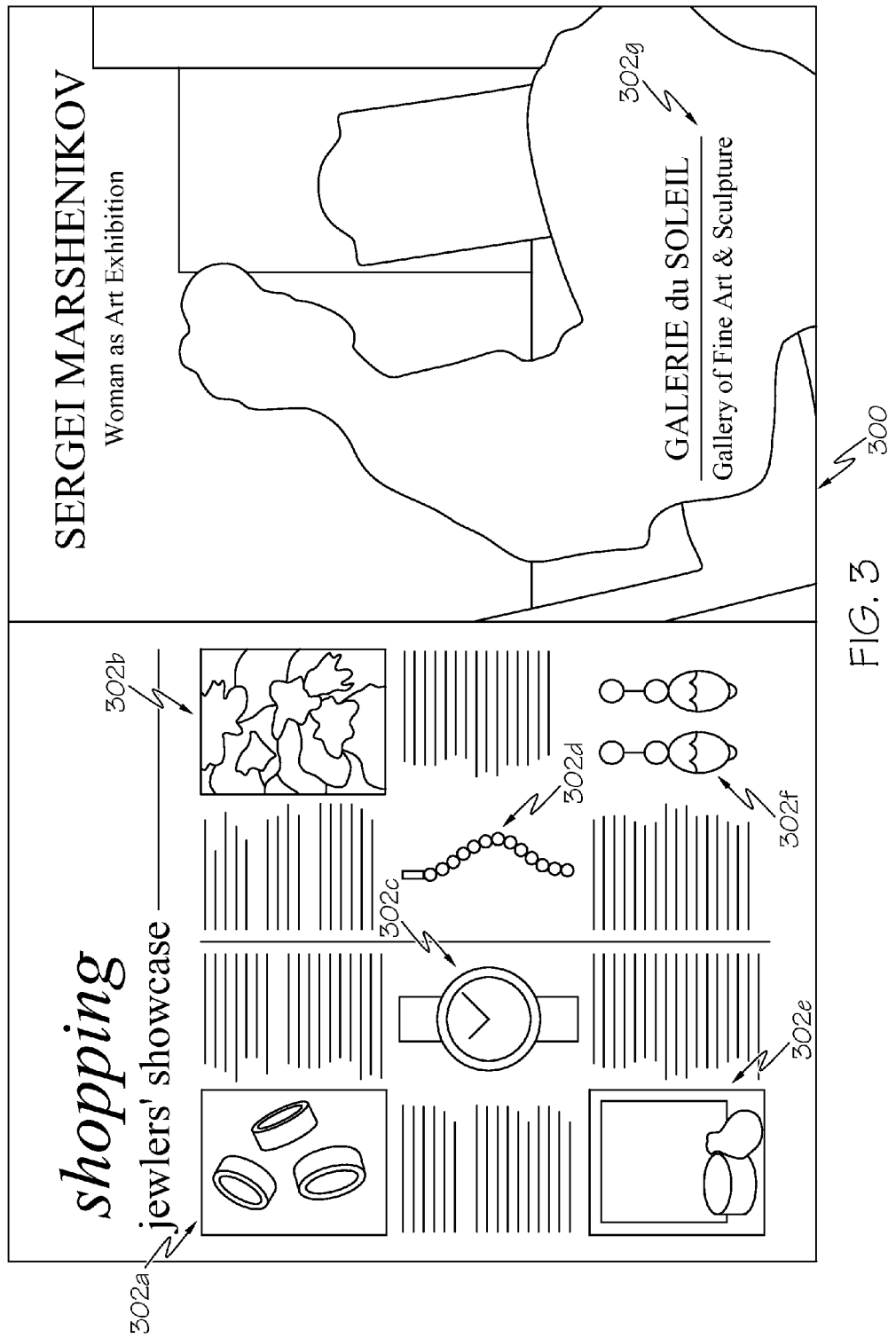
FIG. 3 depicts a user interface for providing a magazine in a static electronic document, according to embodiments disclosed herein.

FIG. 3 depicts a user interface 300 for providing a magazine in a static electronic document, according to embodiments disclosed herein. As illustrated, the user interface 300 is configured as a static electronic document in the form of a magazine. More specifically, the static content displayed in the user interface 300 may include articles about jewelry, art, and sculpture. In addition to text on these topics, the user interface 300 includes images and other static content. Also included in the user interface 300 is a plurality of predetermined areas of interest 302*a*-302*g* that are identified within the static content. As the static content may relate to a product, such as jeweler, predetermined areas of interest 302*a*-302*g* may provide access to underlying dynamic content that may be accessed by a user selecting the predetermined areas of interest 302*a*-302*g*.

It should be understood that the static electronic document may be stored on the user computing device 102*a* and thus may be received in the form of an email attachment or other message attachment. Similarly, in some embodiments, the user may download the static electronic image from a internet website, intranet site, etc. Regardless, the static electronic image may reside locally on the user computing device 102*a* and may provide the user interface 300.

It should also be understood that while not explicitly depicted in FIG. 3, the user interface 300 (and/or other user interfaces described herein) may include a bookmark bar for accessing any page depicted in a table of contents of the static electronic document. A highlight function may also be provided for marking portions of text that area of interest to the user. A bookmarking tab option may also be included to mark a page for later viewing. Additionally, while the user may navigate the static electronic page by page, a "go to page" option may also be provided for automatically navigating to a page of interest.

It should also be understood that the static electronic document may also include analytics functionality to track and report user actions. The analytics functionality may be performed locally and/or remotely and may be configured to determine what content in the static electronic document the user accesses most (and least). Other analytics may be performed to more accurately determine the most valuable advertisement space, as well as determine advertisers that will receive the most benefit for advertising at a particular portion of the static electronic document.

Figure 4:
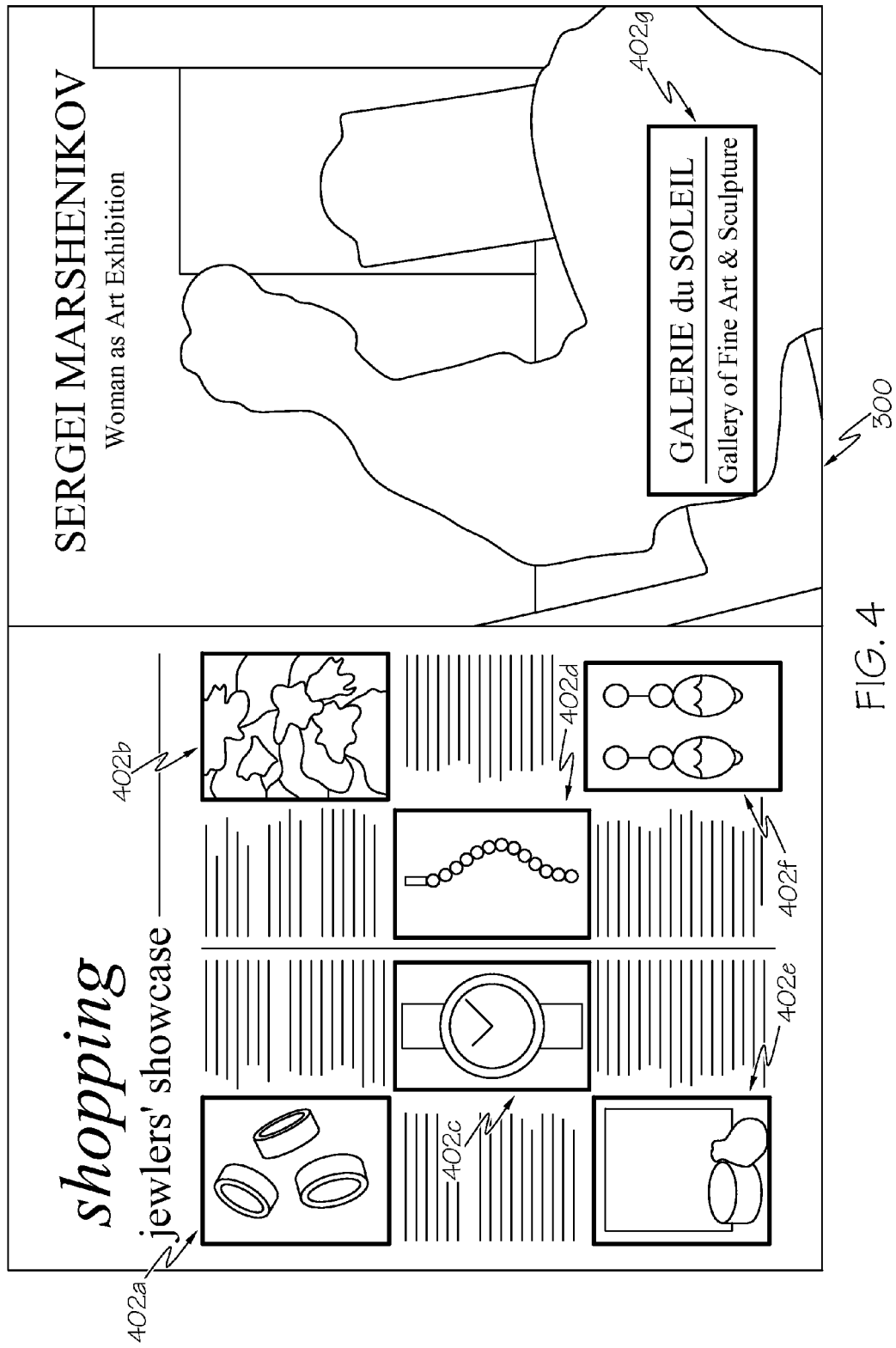
FIG. 4 depicts a user interface for illustrating a predetermined area of interest in the static electronic document where dynamic content may be accessed, according to embodiments disclosed herein.

FIG. 4 depicts the user interface 300 for illustrating a predetermined area of interest in the static electronic document where dynamic content may be accessed, according to embodiments disclosed herein. As illustrated, the user interface 300 may include a plurality of dynamic content identifiers 402*a*-402*g* that correspond with the predetermined areas of interest 302*a*-302*g*, from FIG. 3. Depending on the particular embodiment, the dynamic content identifiers 402*a*-402*g* may or may not be provided to the user, but are depicted in FIG. 4 to indicate the location of the predetermined areas of interest 302*a*-302*g*. Regardless of whether the dynamic content identifiers 402*a*-402*g* are provided to the user, upon a user selection of one of the predetermined areas of interest 302*a*-302*g*, dynamic content may be provided to the user.

Figure 5:
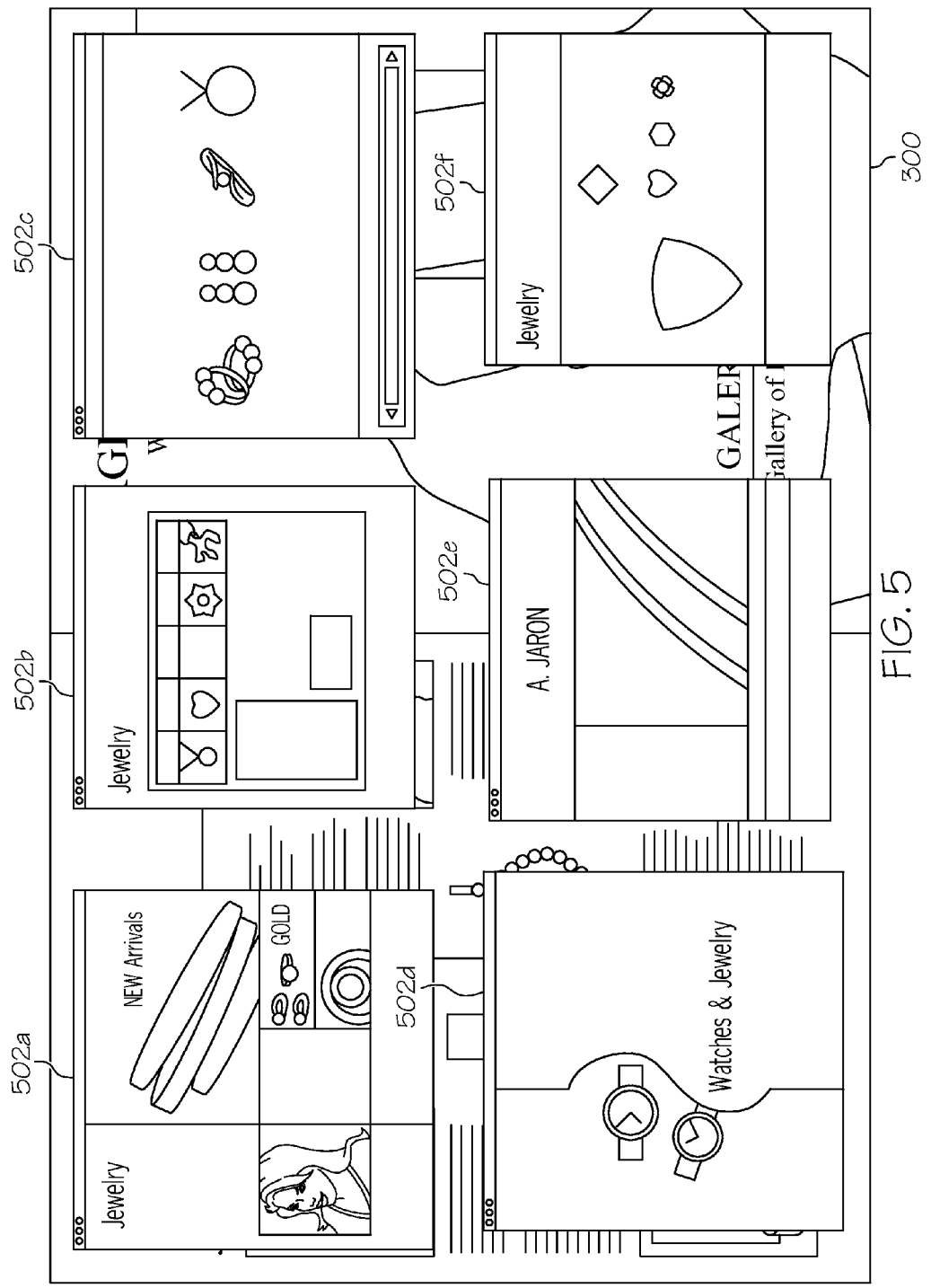
FIG. 5 depicts a user interface for illustrating the potential dynamic content that may be provided in the static electronic document, according to embodiments disclosed herein.

FIG. 5 depicts the user interface 300 for illustrating the dynamic content 502*a*-502*f* that may be provided in the static electronic document, according to embodiments disclosed herein. As illustrated, upon selection of the predetermined areas of interest 302*a*-302*f*, from FIG. 3, the corresponding dynamic content 502*a*-502*f* may be provided. More specifically, the dynamic content 502*a* may include data from a jewelry website to allow the user to view additional information regarding that particular product. The jewelry website may be provided within the context of the static electronic document, such that a web browser on the user computing device 102*a* never needs to be opened.

Similarly, upon selection of the predetermined area of interest 302*b* (FIG. 3), the dynamic content 502*b* may be provided, which may provide different functionality and/or data for a different jewelry product. More specifically, while the predetermined area of interest 302*a* (and thus the dynamic content 502*a*) provides data from a website, the predetermined area of interest 302*b* (and thus the dynamic content 502*b*) may provide non-web data about the selected product. Similarly, the dynamic content 502*c* may include video data about the selected product. The dynamic content 502*d* may include a flash animation regarding a corresponding product. The dynamic content 502*e* may provide related products to the selected product. The dynamic content 502*f* may provide purchasing options for the corresponding product. Depending on the particular embodiment, the purchasing options may be provided through a corresponding website and/or without allowing the user to directly interact with the vendor.

More specifically, in some embodiments, the dynamic content 502*f* may be configured to provide a product purchase interface, which may include a portal to a website of the vendor of the selected product. In such an example, upon selection of the area of interest 302*f* (FIG. 3), the dynamic content 502*f* may be provided as a window in the static electronic document. While provided as a window in the static electronic document the dynamic content may actually be the interface of the vendor website (which includes a purchase option). The user may then purchase and pay for the product through this interface. In this embodiment, the static electronic document merely provides the vendor website content without the user having to open a web browser.

Similarly, in some embodiments, the remote computing device 102*b* collects data from the vendor and provides a product purchase interface without providing the vendor website to the user. The product purchase interface in this example includes the collected data (such as pictures of the product, price, description, user ratings and reviews, and a purchase option) to the user to provide the purchasing options and/or payment option. In this example however, the user is not directly communicating with the vendor. Instead, the user interaction is with the static electronic document (and thus the remote computing device 102*b*) to purchase the product. As such, the remote computing device 102*b* may also be configured for performing user authentication.

While in some embodiments, the remote computing device 102*b* may perform a user authentication as a security measure before providing the dynamic content to the user, in this embodiment user authentication may be performed to complete a purchase. More specifically, upon attempting to purchase the product, the user computing device 102*a* may request a user identifier and password (and/or other user authentication) associated with the vendor and/or remote computing device 102*b*. If the user account is directly with the vendor, the user computing device 102*a* and/or remote computing device 102*b* can send the received authentication information to the vendor to complete the purchase on behalf of the user. If however, the user authentication is with the remote computing device 102*b*, upon authenticating the user, the remote computing device 102*b* can facilitate purchase and payment of the product.

Payment of the product in this example may utilize any number of mechanisms. In some embodiments, the remote computing device 102b can receive payment information (such as credit card data) from the user and directly charge that account to make payment. The remote computing device 102b can then pay the vendor directly. This allows the remote computing device 102b to receive the payment and potentially charge a service fee to the user for facilitating the purchase for the user. In some embodiments however, the remote computing device 102b can merely link the user to a third party payment mechanism and/or to the vendor directly.

It should also be understood that by facilitating the purchase, the remote computing device 102b may also provide discounts to the user by purchasing through the static electronic document. More specifically, because advertisers wish to utilize the purchasing functionality provided by the static electronic document, the remote computing device 102b may negotiate discounts for the user and/or may charge the advertiser for this option.

It should be understood that while a plurality of different dynamic content 502a-502f is depicted in FIG. 5, this is merely an example. More specifically, in some embodiments, only one or a subset of all the available dynamic content may be provided at a given time. Additionally, it should also be understood that while the dynamic content 502a-502f depicted in FIG. 5 is illustrated as popup features of the static electronic document; this is also an example. In some embodiments, the dynamic content 502a-502f may be provided within the boundaries of the corresponding predetermined areas of interest 302 (FIG. 3).

Similarly, while the areas of interest in FIGS. 3-5 relate to advertisements for products, this is merely an example. Some embodiments may include areas of interest (and thus dynamic content) to provide additional information related to the content of an article. As an example, if there is a term of art that many users would not understand, an area of interest may be created to provide dynamic content (such as a definition, video clip, etc.) to elaborate on that term.

Figure 6:
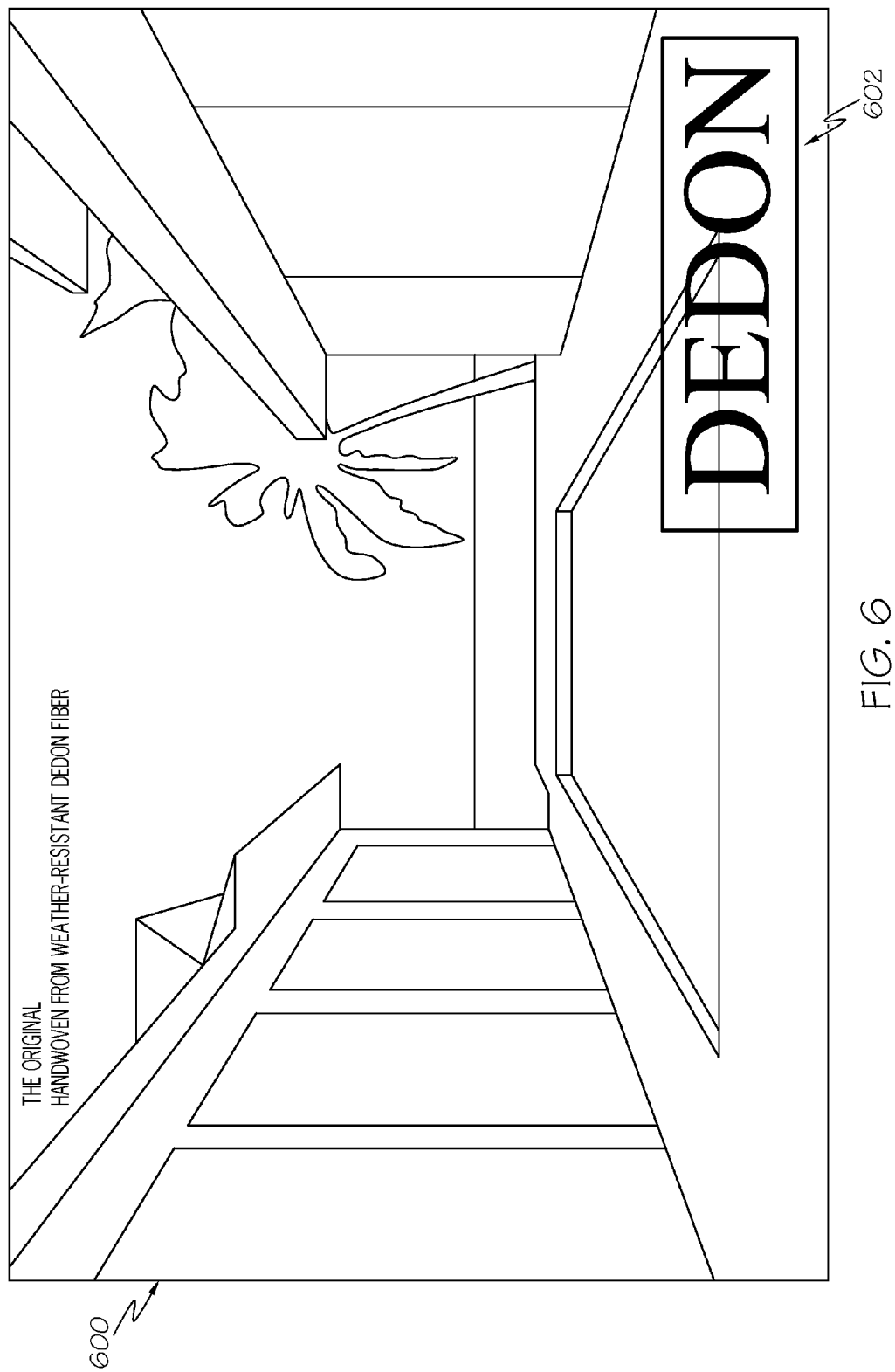
FIG. 6 depicts a user interface that may include a predetermined area of interest in a static electronic document for accessing dynamic content, according to embodiments disclosed herein.

FIG. 6 depicts a user interface 600 that may include a predetermined portion of a static electronic document for accessing dynamic content, according to embodiments disclosed herein. As illustrated, the static electronic document may include another page, depicted as the user interface 600. In the user interface 600, a predetermined area of interest 602 may be provided with or without a dynamic content identifier. Upon selection of the predetermined area of interest 602, dynamic content may be provided. As indicated above, in some embodiments, the dynamic content identifier may be hidden from the user, with the functionality being intact.

Figure 7:
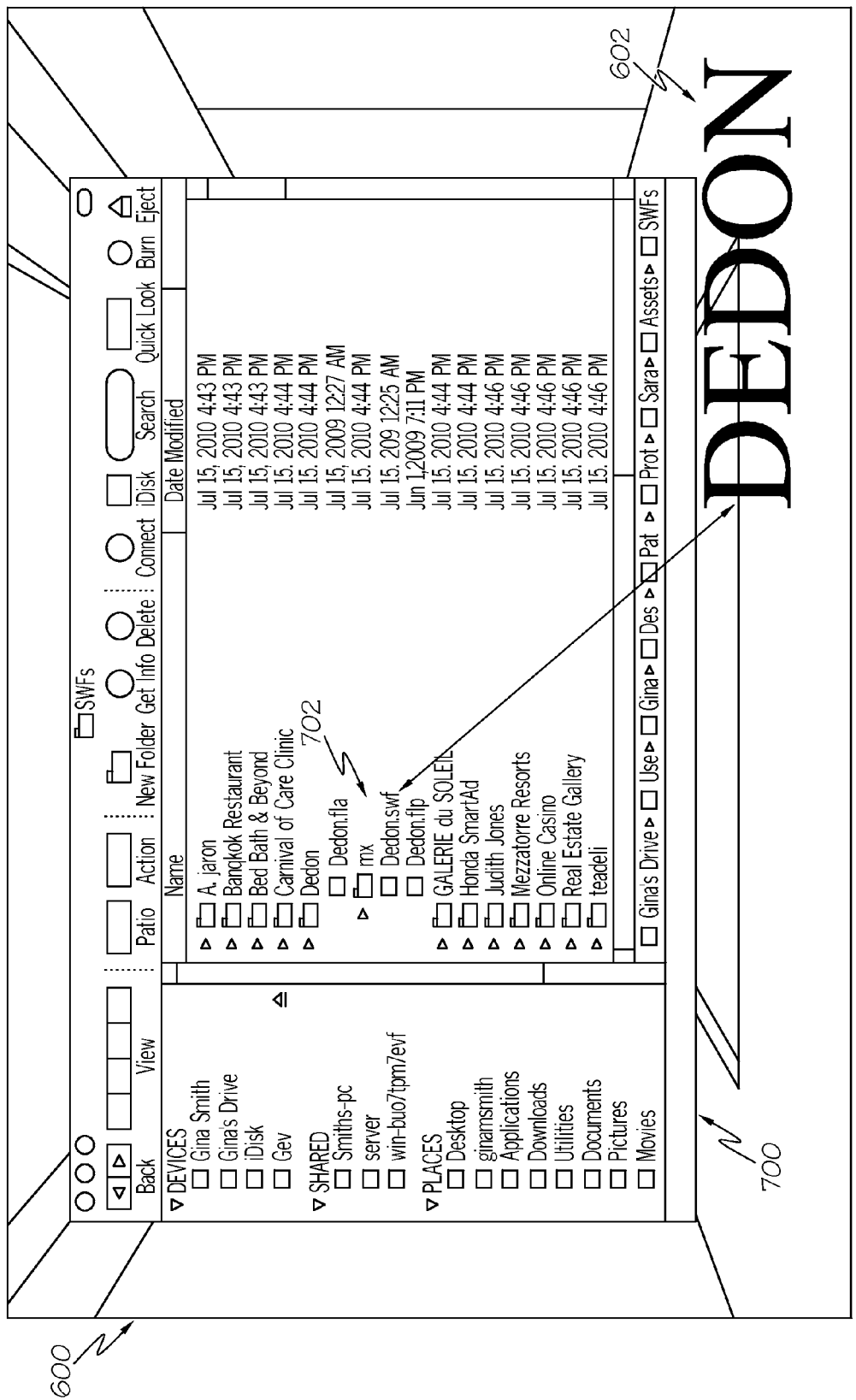
FIG. 7 depicts a user interface for illustrating a computer program for providing the dynamic content, according to embodiments disclosed herein.

FIG. 7 depicts a user interface 700 for illustrating a computer program for providing the dynamic content, according to embodiments disclosed herein. As illustrated in the user interface 700, the predetermined area of interest 602 may be associated with a computer program 702 or plurality of computer programs for providing the dynamic content. More specifically, upon selecting the predetermined area of interest 602, the static electronic document may have a pointer that links the area of interest 602 to the computer program 702 for providing the dynamic content. The computer program 702 may be locally stored on the user computing device 102a and/or remotely stored, depending on the particular embodiment. The pointer thus causes the user computing device 102a to execute the computer program 702, which may then retrieve the dynamic content from the remote computing device 102b. The user computing device 102a may then incorporate that dynamic content into the appropriate area of the static electronic document.

It should be understood that, depending on the particular embodiment, the user interface 700 may be provided only to an administrator, such as on the remote computing device 102b and/or the administrator computing device 102c. More specifically, as the user does not need to know from where the dynamic content originates, the user interface 700 need not be presented on the user computing device 102a. In fact, in order to provide a seamless experience to the user, some embodiments prevent the user from accessing the user interface 700.

It should also be understood that in some embodiments, the computer program may be stored on the remote computing device 102b. In such an embodiment, the static electronic document may simply be configured to redirect the user computing device 102a to the remote computing device 102b in response to selection of an area of interest. At this point, the remote computing device 102b can execute the computer program to provide the dynamic content to the user computing device 102a.

Figure 8:
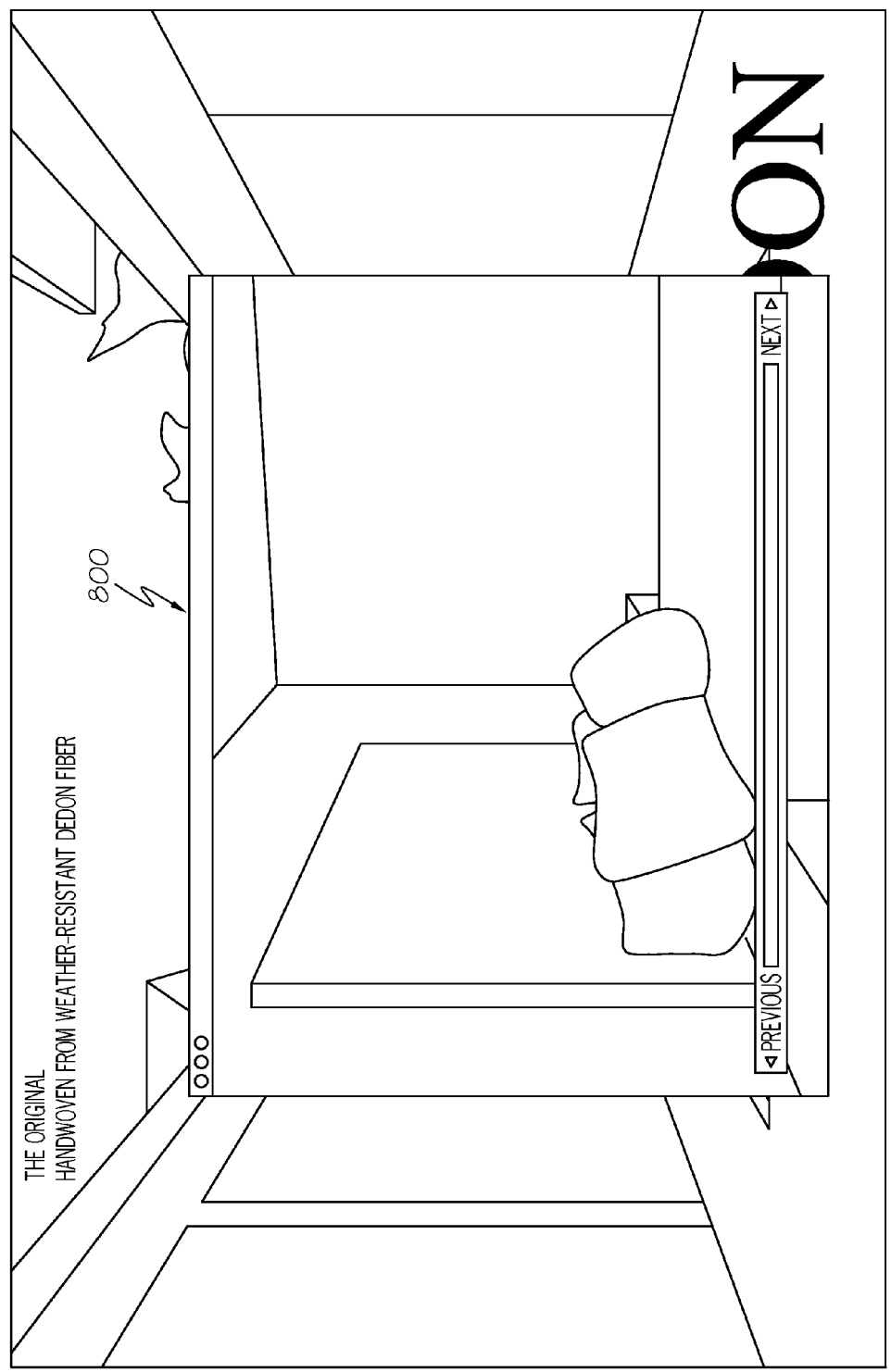
FIG. 8 depicts a user interface for providing the dynamic content, according to embodiments disclosed herein.

FIG. 8 depicts a user interface 800 for providing the dynamic content, according to embodiments disclosed herein. As illustrated, in response to selecting the predetermined area of interest 602 (FIG. 6), the user interface 800 may be provided with the corresponding dynamic content. As illustrated, the dynamic content in the user interface 800 may include dynamic content that is provided within the static electronic document. As an example, the user interface 800 may include a slideshow of one or more products. The dynamic content may include options to navigate the slide show, as well as options to email the vendor associated with the dynamic content, purchase options, and/or other options.

Figure 9:
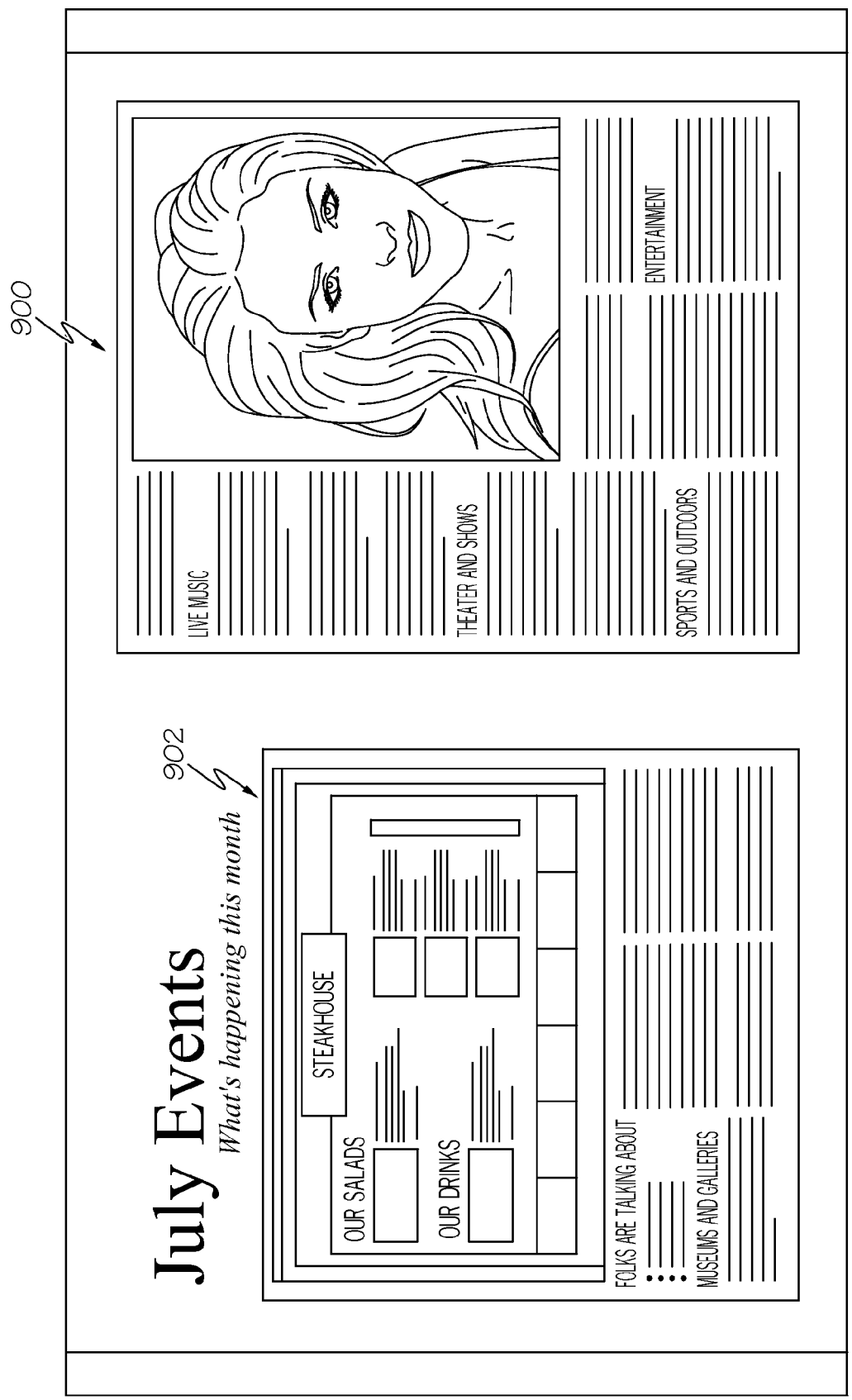
FIG. 9 depicts a user interface for providing dynamic restaurant options, according to embodiments disclosed herein.

FIG. 9 depicts a user interface 900 for providing dynamic restaurant options, according to embodiments disclosed herein. As illustrated, the user interface 900 may be part of the static electronic document and may include a restaurant advertisement and one or more predetermined areas of interest 902. In some embodiments, the entire advertisement may be selectable to launch the dynamic content. However, in some embodiments, the advertisement may include a plurality of different predetermined areas of interest for each option provided within the advertisement.

Figure 10:
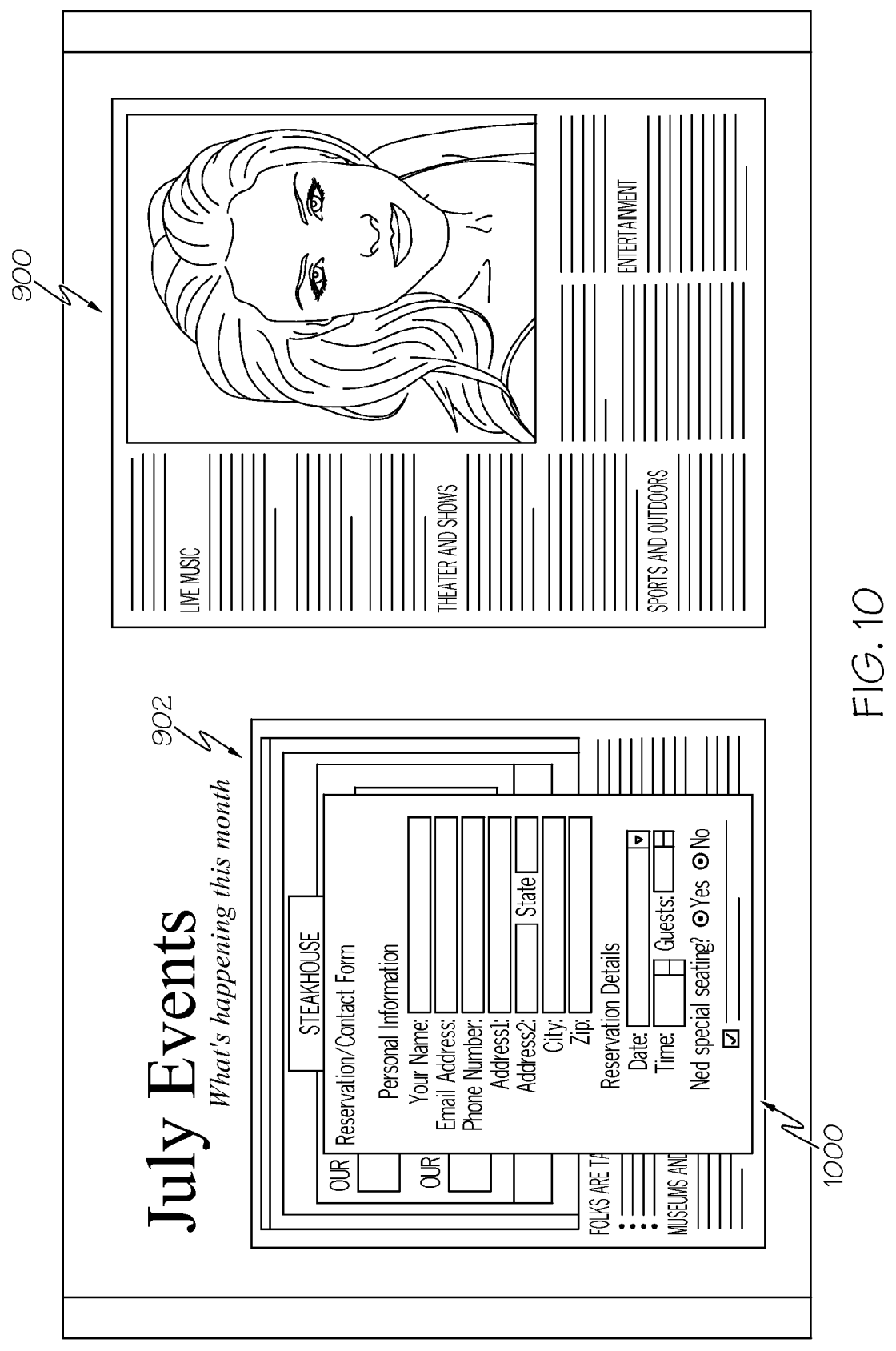

FIG. 10 depicts a user interface 1000 for providing dynamic reservation options, according to embodiments disclosed herein. As illustrated, in response to selecting the predetermined area of interest 902 (FIG. 9), the user interface 1000 may be provided. More specifically, the user interface 1000 may provide the user with the option of securing a reservation with the restaurant that provided the advertisement. Accordingly, the user can enter the personal information to complete the form and/or the user computing device 102a can automatically populate the desired fields with the user information. Additionally, in some embodiments, the user may have an account with the remote computing device 102b. As such, the user may be required to authenticate before accessing the dynamic content. The authentication may include name, address, phone number, credit card number, etc. such that the user can receive the dynamic content and quickly and easily make purchases directly through the static electronic document. Once authenticated, the form may be automatically completed with the user information and the user interface 1000 may simply ask for the reservation details.

It should be understood that in some embodiments, the static electronic document may determine a current location of the user based on a global positioning determination, internet protocol (IP) address, cellular triangulation, etc. With this information, a determination may be made regarding whether the user may desire to make reservations for a particular branch of the restaurant.

It should also be understood that while the dynamic content may relate to making restaurant reservations, this is merely an example. More specifically, options and hotel reservations, airline reservations, and/or other reservations may be provided and included within the scope of this disclosure.

Figure 11:
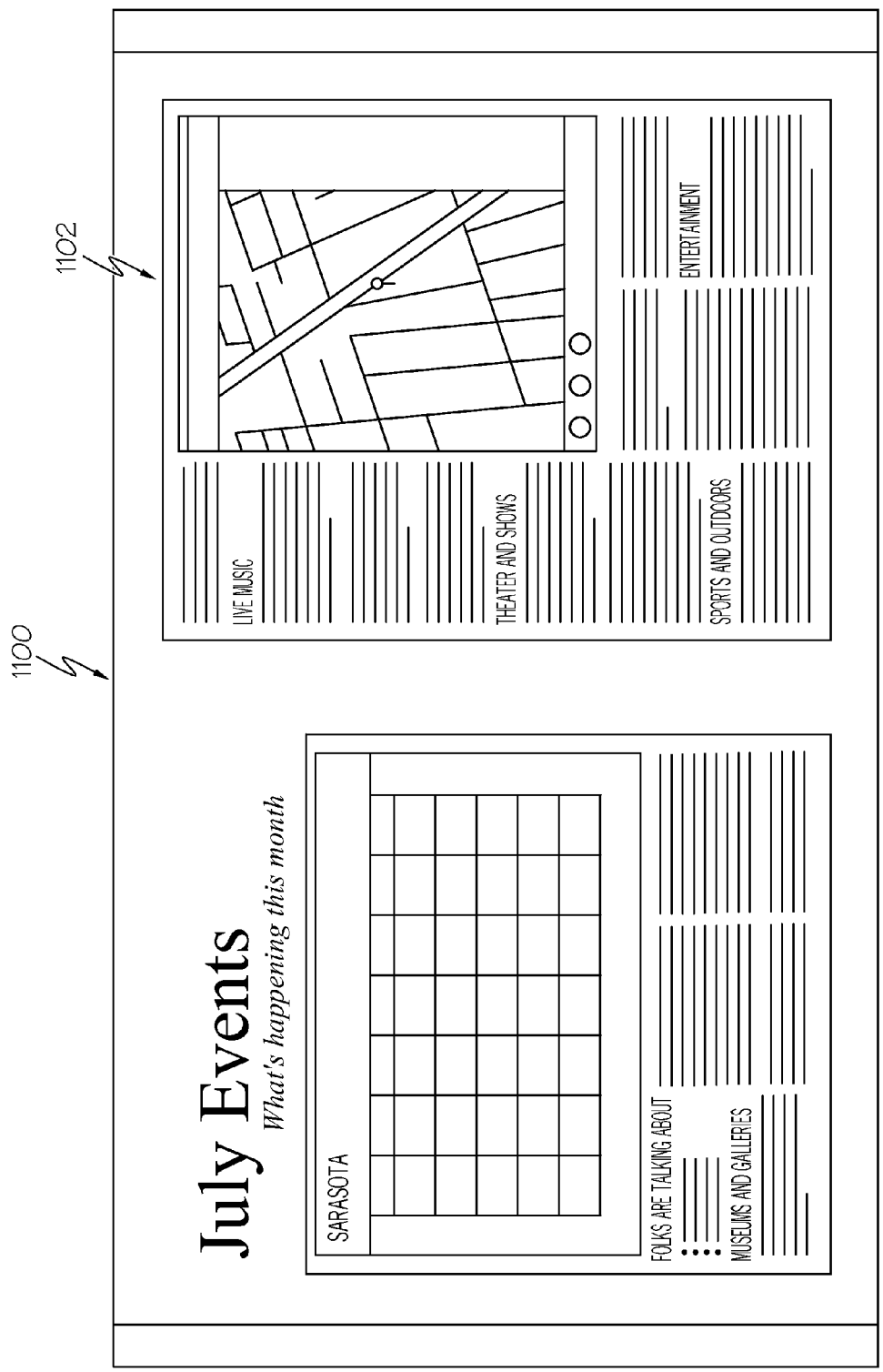
FIG. 11 depicts a user interface for providing dynamic calendar and mapping options, according to embodiments disclosed herein.

FIG. 11 depicts a user interface 1100 for providing dynamic calendar and mapping options, according to embodiments disclosed herein. As illustrated, the user interface 1100 may include a predetermined area of interest 1102. More specifically, the predetermined area of interest 1102 may include an interactive map, which determines the user's current location and may provide directions to one or more of the locations discussed in the static content. As an example, the static content in FIG. 11 discusses live audio and more particularly, may reference one or more venues. By selecting the predetermined area of interest 1102 (or by merely turning to this page of the static electronic document), the dynamic content (via the user computing device 102a and/or remote computing device 102b) can determine the user location and utilize mapping functionality to provide directions to one or more of the venues discussed in the static content.

Figure 12:
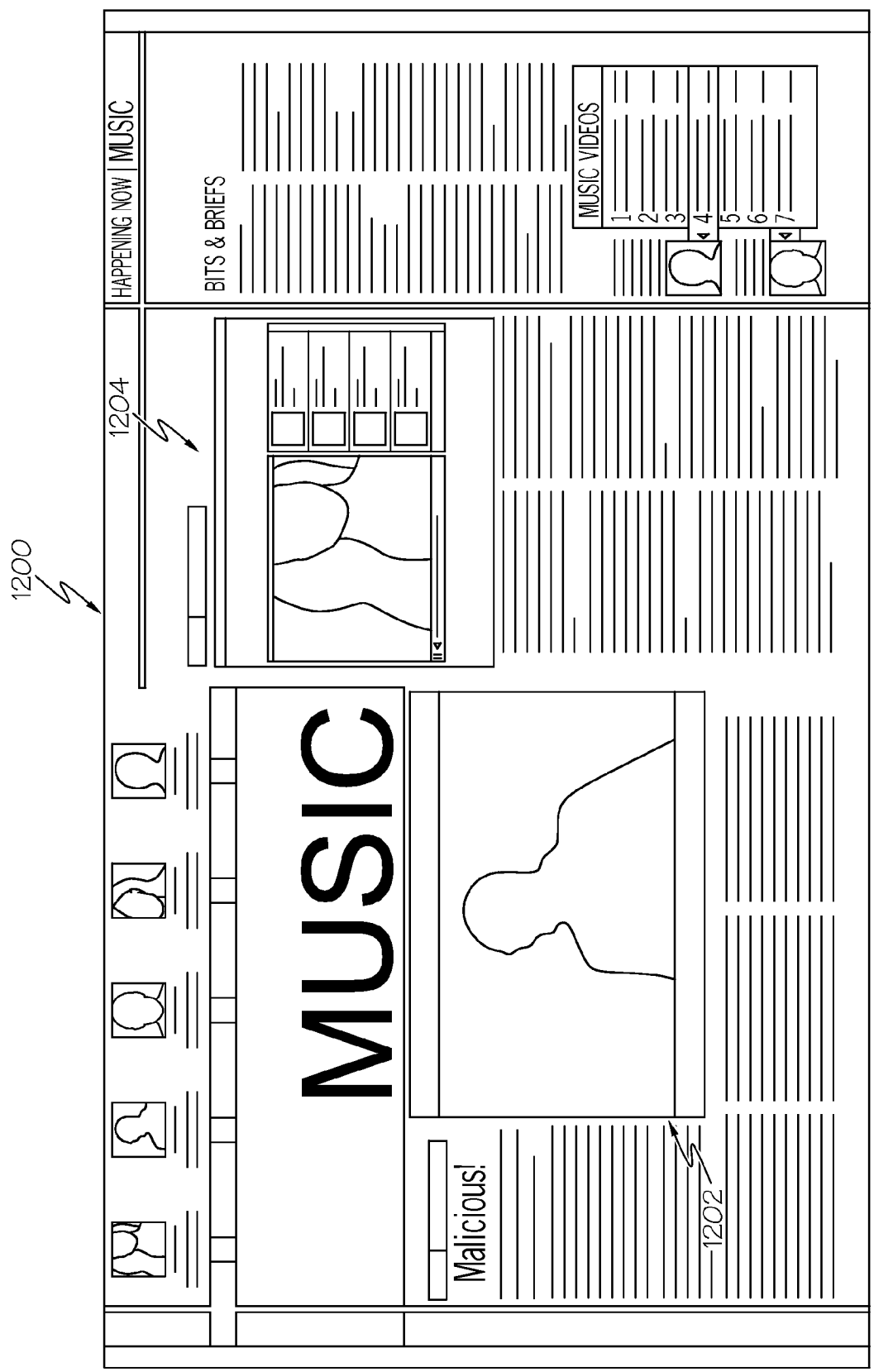
FIG. 12 depicts a user interface for providing dynamic audio and/or video content, according to embodiments disclosed herein.

FIG. 12 depicts a user interface 1200 for providing dynamic audio and/or video content, according to embodiments disclosed herein. As illustrated, the user interface 1200 may include static content related to music and/or other entertainment. Additionally, the static electronic document may provide dynamic content in the form of audio content, video content, ticket purchasing options to concerts, email addresses of the artists, etc. As discussed above, the dynamic content may be accessed via a user selection of the predetermined areas of interest 1202, 1204 and/or automatically provided upon turning to the page depicted in the user interface 1202. In the embodiments where the dynamic content is streaming content, the remote computing device 102b may simply stream the content to the user computing device 102a, as discussed above. However, when the dynamic content is live content (e.g. live audio and/or live video), the remote computing device 102b may include a content server for providing the live content to a plurality of users.

It should also be understood that while two predetermined areas of interest are identified in FIG. 12, this is merely an example. In some embodiments, any reference in static textual data to an artist, song, television program, movie, etc. may also be a predetermined area of interest for launching the associated dynamic content. Additionally, while one particular predetermined area of interest may launch a single song, television program, movie, etc., in some embodiments, selection of the predetermined area of interest may launch an interface that can play a plurality of different songs, television programs, movies, etc.

Figure 13:
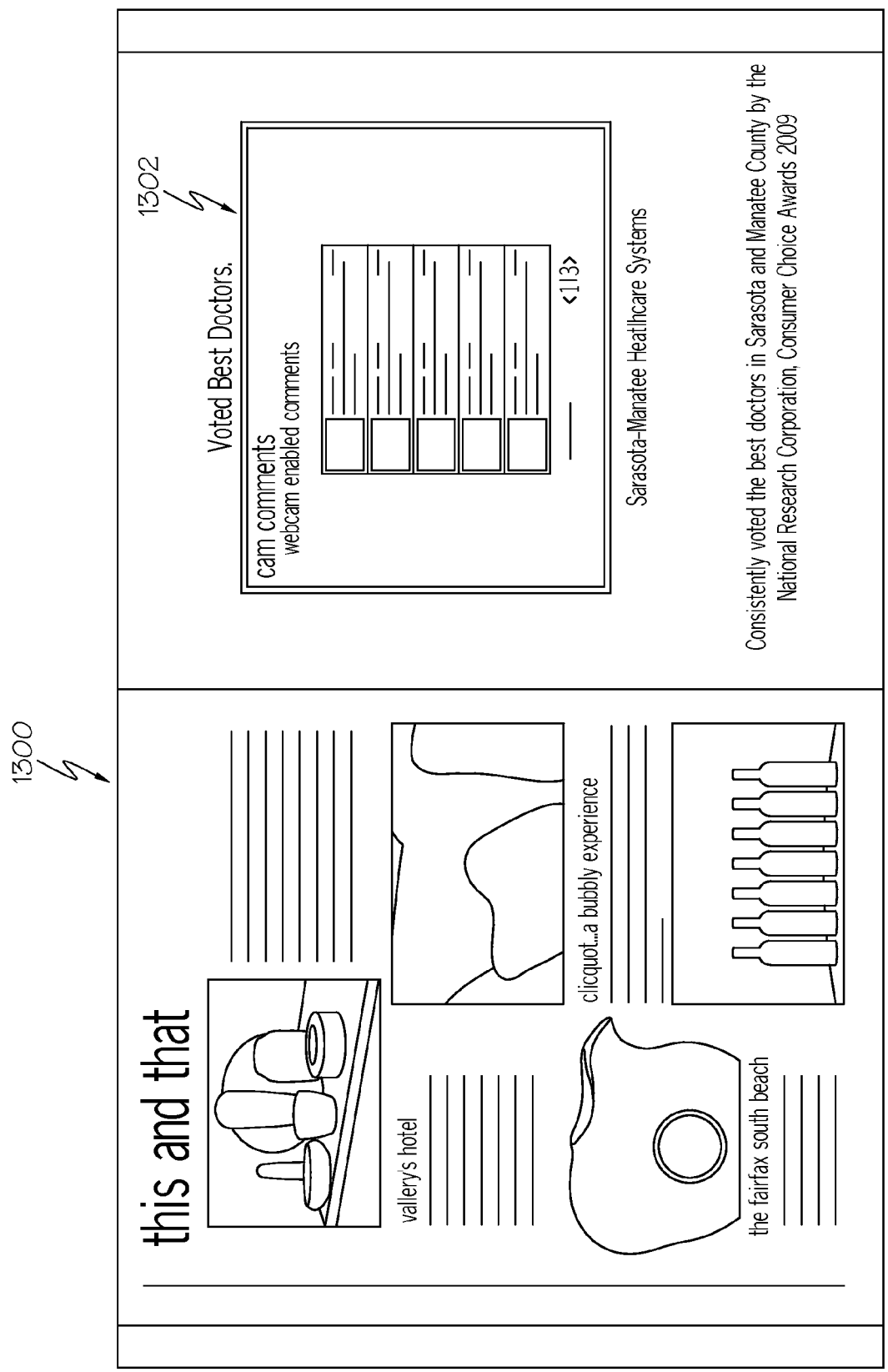
FIG. 13 depicts a user interface for providing dynamic commenting, according to embodiments disclosed herein.

FIG. 13 depicts a user interface 1300 for providing dynamic commenting, according to embodiments disclosed herein. As illustrated, the user interface 1300 may include a social media area of interest 1302 for viewing and/or providing comments about a particular product. As an example, if the related static content is "Sarasota Healthcare Systems" the static electronic document may additionally provide a real-time comments section. The comments section may be updated from other static electronic documents, from social media websites and/or elsewhere. Regardless, through this mechanism, the user can view and add comments for to this dynamic content.

Additionally, in some embodiments, the user interface 1300 may include annotation options for allowing a user of the user computing device 102a to annotate the static electronic document with highlights, notes, etc. In such an embodiment, the user may annotate the document, which may be saved in the static electronic document for subsequent viewing s.

Figure 14:
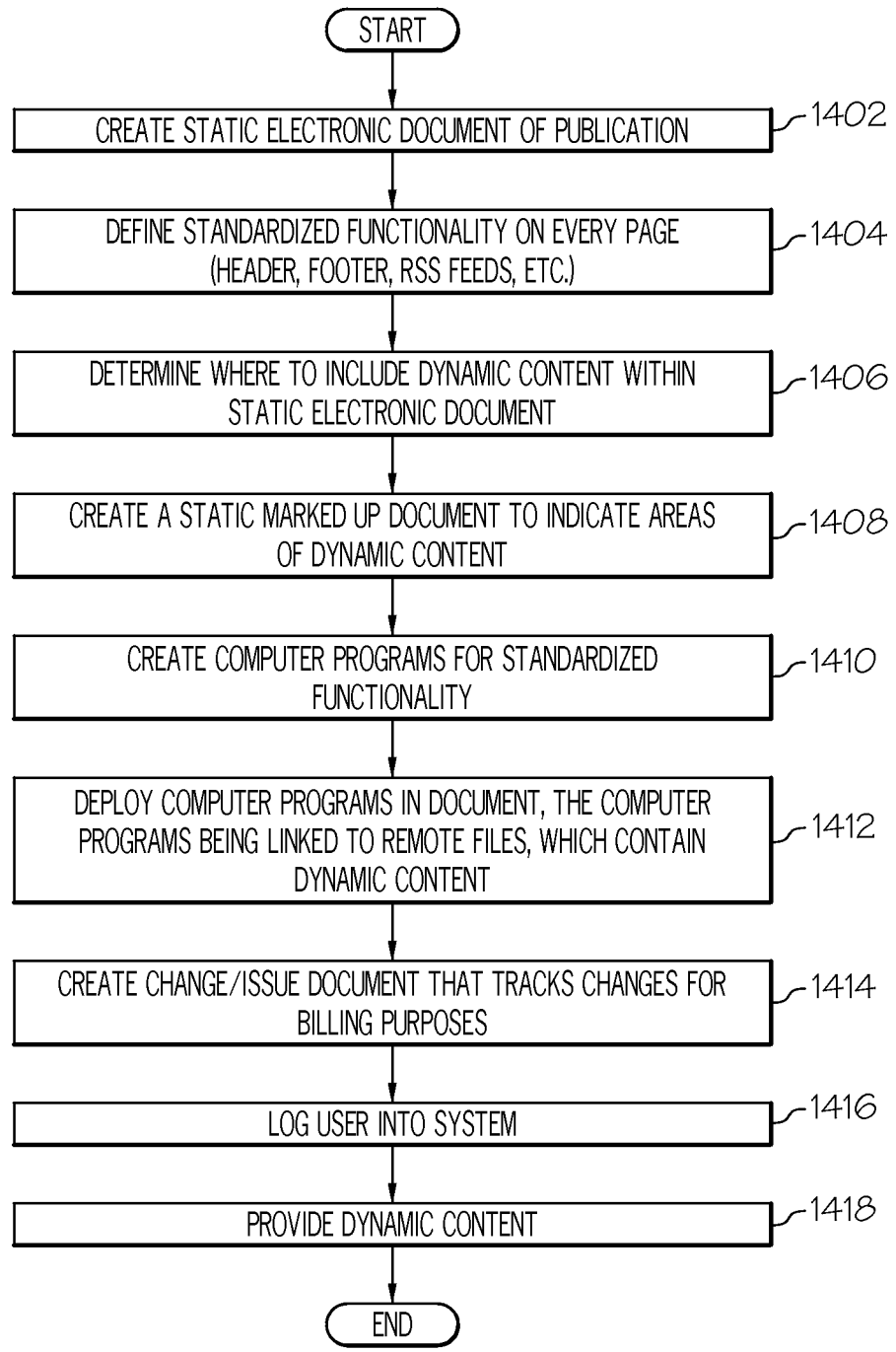
FIG. 14 depicts a flowchart for providing dynamic content in a static electronic document, according to embodiments disclosed herein.

FIG. 14 depicts a flowchart for providing dynamic content in a static electronic document, according to embodiments disclosed herein. As illustrated in block 1402, a static electronic document of a publication may be created. In block 1404, standardized functionality may be defined for each page of the static electronic document (e.g., headers, footers, RSS feeds, etc.). In block 1406, a determination may be made regarding where, within the static electronic document, to include the dynamic content. In block 1408, a static marked up document may be created to indicate areas where dynamic content will be placed. In block 1410, one or more computer programs may be created for standardized functionality of the dynamic content. In block 1412, the computer programs may be deployed in the static electronic document, where the computer programs are linked to remote files, which contain dynamic content. In block 1414, a change/issue document may be created for tracking changes to the static electronic document for billing purposes. In block 1416, the user can be logged into the system. In block 1418, the dynamic content may be provided to the user.

Figure 15:
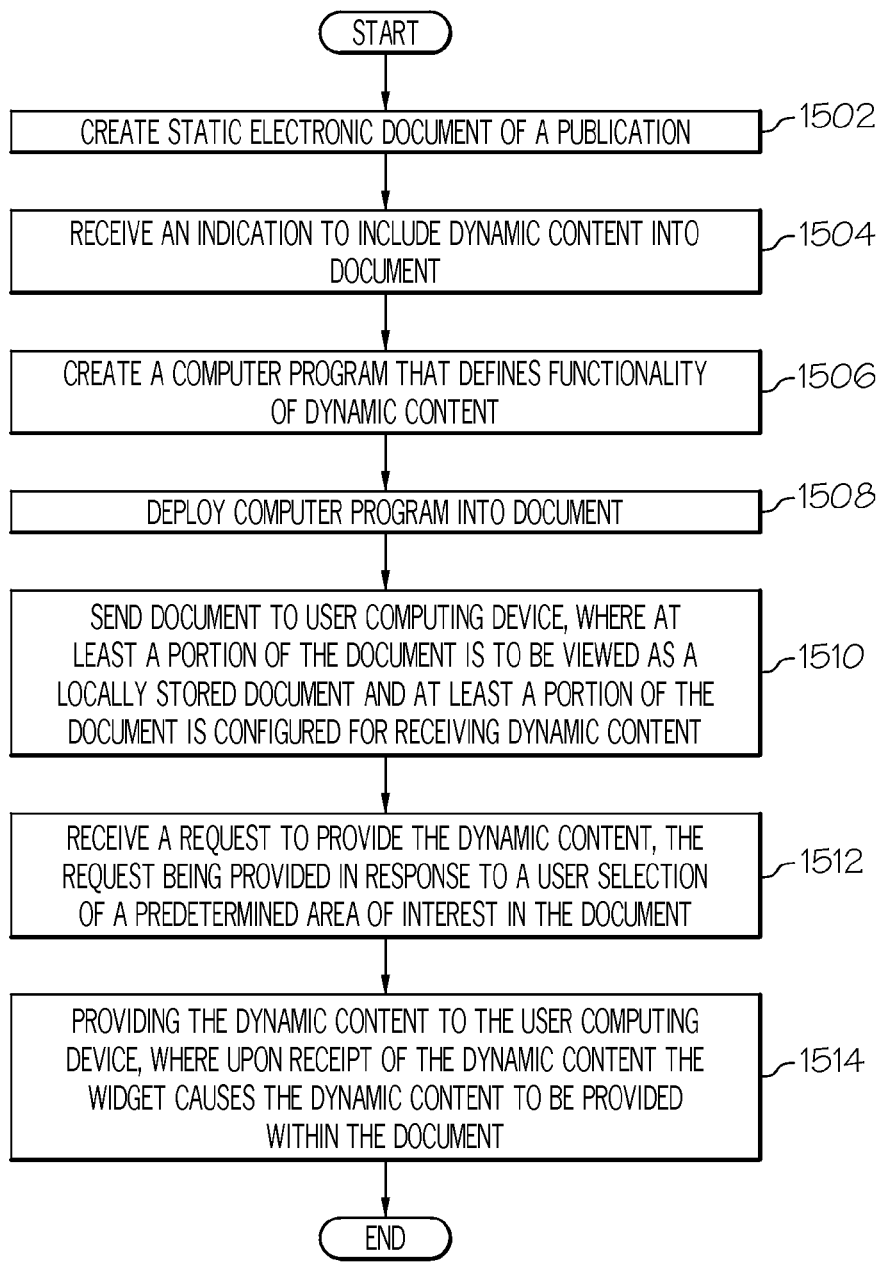
FIG. 15 depicts another flowchart for providing dynamic content in a static electronic document, according to embodiments disclosed herein.

FIG. 15 depicts another flowchart for providing dynamic content in a static electronic document, according to embodiments disclosed herein. As illustrated in block 1502, a static electronic document of a publication may be created. In block 1504, an indication to include dynamic content into the static electronic document may be received. In block 1506, a computer program may be created that defines functionality of the dynamic content. In block 1508, the remote computing device 102b can deploy the computer program into the static electronic document. In block 1510, the static electronic document may be sent to the user computing device 102a, where at least a portion of the static electronic document is to be viewed as a locally stored document and at least a portion of the document is configured for receiving dynamic content. In block 1512, a request to provide the dynamic content may be received, where the request is provided in response to a user selection of a predetermined area of interest in the static electronic document. In block 1514, the dynamic content may be provided to the user computing device 102a, where upon receipt of the dynamic content, the computer program causes the dynamic content to be provide within the static electronic document.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all permutations and sub-permutations of all elements, features, and aspects discussed above. All such modifications and variations are intended to be included herein within the scope of this disclosure.

Therefore, at least the following is claimed:

1. A method for providing dynamic content into a static electronic document, comprising:

creating the static electronic document of a publication, wherein the publication comprises a replica of a paper-based printed publication, wherein the static electronic document is configured to be displayed with the same look and feel as the printed publication, and wherein the static electronic document functions as a locally stored software application;

receiving an indication to include the dynamic content into the static electronic document, wherein the dynamic content includes a smart advertisement, the smart advertisement including an option for a user to opt into receiving content of the smart advertisement;

creating a computer program that defines functionality of the dynamic content;

deploying the computer program into the static electronic document, wherein the computer program is linked to a remote file that contains the dynamic content;

sending the static electronic document to a user computing device, wherein at least a first portion of the static electronic document is configured to be viewed as a locally stored document and at least a second portion of the static electronic document receives the dynamic content from a remote computing device, wherein the static electronic document comprises a pointer that causes the user computing device to utilize the computer program for retrieving the dynamic content from the remote computing device;

receiving a request to provide the dynamic content, the request being provided in response to a user selection of a predetermined area of interest in the static electronic document;

providing the dynamic content to the user computing device, wherein upon receipt of the dynamic content, the computer program causes the dynamic content to be provided within the predetermined area of interest in the static electronic document, wherein the dynamic content comprises an option to place an order;

receiving a user selection of the option to place the order, wherein the user selection is performed via an interaction with the dynamic content within the static electronic document;

processing the user selection within the static electronic document to place the order with a vendor that is associated with the dynamic content.

2. The method of claim 1, wherein the publication comprises at least one of the following: a magazine, a newspaper, a brochure, a pamphlet, a sales slick, a manual, an encyclopedia, an atlas, a resume, a deposition, a dossier, a report, and a book.

3. The method of claim 1 wherein the option to place the order includes an option to purchase a product displayed in the static electronic document.

4. The method of claim 1, wherein processing the user selection within the static electronic document comprises at least one of the following:

providing interface data retrieved from a vendor within the static electronic document, providing an order placing interface, receiving payment authorization from a user, and providing payment to the vendor, and providing a an order placing interface, which includes a payment option for the user to submit the payment to a third party payment mechanism.

5. The method of claim 1, wherein the dynamic content comprises at least one of the following: an image, streaming video, streaming audio, a product purchase interface, a live video, a live audio, an interactive map, and a really simple syndication (RSS) feed.

6. The method of claim 1, further comprising performing user authentication prior to providing the dynamic content to the user computing device.

7. The method of claim 1, further comprising monitoring user actions on the dynamic content.

8. A system for providing dynamic content in a static electronic document, comprising:

a memory component that stores logic that causes a remote computing device to perform at least the following:

create the static electronic document of a publication, wherein the publication comprises a replica of a paper-based printed publication, wherein the static electronic document is configured to be displayed with the same look and feel as the printed publication, and wherein the static electronic document functions as a locally stored software application;

receive an indication to include the dynamic content into the static electronic document;

create a computer program that defines functionality of the dynamic content;

deploy the computer program into the static electronic document, wherein the computer program is linked to a remote file that contains the dynamic content;

send the static electronic document to a user computing device, wherein at least a first portion of the static electronic document is configured to be viewed as a locally stored document and at least a second portion of the static electronic document receives the dynamic content from the remote computing device, wherein the static electronic document comprises a pointer that causes the user computing device to utilize the computer program for retrieving the dynamic content from the remote computing device;

receive a request to provide the dynamic content, the request being provided in response to a user selection of a predetermined area of interest in the static electronic document;

provide the dynamic content to the user computing device, wherein upon receipt of the dynamic content, the computer program causes the dynamic content to be provided within the predetermined area of interest in the static electronic document, wherein the dynamic content comprises an option to make a reservation;

receiving a user selection of the option to make the reservation, wherein the user selection is performed via an interaction with the dynamic content within the static electronic document; and processing the user selection within the static electronic document to make the reservation with a vendor that is associated with the dynamic content.

9. The system of claim 8, wherein the publication comprises at least one of the following: a magazine, a newspaper, a brochure, a pamphlet, a sales slick, a manual, an encyclopedia, an atlas, a resume, a deposition, a dossier, a report, and a book.

10. The system of claim 8, wherein the dynamic content further comprises a purchase option to purchase a product displayed in the static electronic document, wherein in response to selection of the purchase option, purchase of the product is facilitated within the static electronic document.

11. The system of claim 10, wherein facilitating purchase of the product within the static electronic document comprises at least one of the following:
providing interface data retrieved from a vendor within the static electronic document,
providing a reservation interface, receiving payment authorization from a user, and providing payment to the vendor, and
providing a reservation interface, which includes a payment option for the user to submit the payment to a third party payment mechanism.

12. The system of claim 8, wherein the dynamic content comprises at least one of the following: an image, streaming video, streaming audio, a product purchase interface, a live video, a live audio, an interactive map, and a really simple syndication (RSS) feed.

13. The system of claim 8, wherein the logic further causes the system to perform user authentication prior to providing the dynamic content to the user computing device.

14. The system of claim 8, wherein the logic further causes the system to monitor user actions on the dynamic content.

15. A non-transitory computer-readable medium for providing dynamic content in a static electronic document that stores logic for causing a remote computing device to perform at least the following:
create the static electronic document of a publication, wherein the publication comprises a replica of a paper-based printed publication, wherein the static electronic document is configured to be displayed with the same look and feel as the printed publication, and wherein the static electronic document functions as a locally stored software application;
receive an indication to include the dynamic content into the static electronic document;
create a computer program that defines functionality of the dynamic content;
deploy the computer program into the static electronic document, wherein the computer program is linked to a remote file that contains the dynamic content;
send the static electronic document to a user computing device, wherein at least a first portion of the static electronic document is configured to be viewed as a locally stored document and at least a second portion of the static electronic document receives the dynamic content from the remote computing device, wherein the static electronic document comprises a pointer that causes the user computing device to utilize the computer program for retrieving the dynamic content from the remote computing device;
receive a request to provide the dynamic content, the request being provided in response to a user selection of a predetermined area of interest in the static electronic document;
provide the dynamic content to the user computing device, wherein upon receipt of the dynamic content, the computer program causes the dynamic content to be provided within the predetermined area of interest in the static electronic document, wherein the dynamic content comprises an option to place an order;
receiving a user selection of the option to purchase a product, wherein the user selection is performed via an interaction with the dynamic content within the static electronic document; and
processing the user selection within the static electronic document to purchase the product with a vendor that is associated with the dynamic content.

16. The non-transitory computer-readable medium of claim 15, wherein the publication comprises at least one of the following: a magazine, a newspaper, a brochure, a pamphlet, a sales slick, a manual, an encyclopedia, an atlas, a resume, a deposition, a dossier, a report, and a book.

17. The non-transitory computer-readable medium of claim 15, wherein in response to selection of the purchase option, purchase of the product is facilitated within the static electronic document, and wherein facilitating purchase of the product within the static electronic document comprises at least one of the following:
providing interface data retrieved from a vendor within the static electronic document,
providing a product purchase interface, receiving payment authorization from a user, and providing payment to the vendor, and
providing a product purchase interface, which includes a payment option for the user to submit the payment to a third party payment mechanism.

18. The non-transitory computer-readable medium of claim 15, wherein the dynamic content comprises at least one of the following: an image, streaming video, streaming audio, a product purchase interface, a live video, a live audio, an interactive map, and a really simple syndication (RSS) feed.

19. The non-transitory computer-readable medium of claim 15, wherein the logic further causes the remote computing device to perform user authentication prior to providing the dynamic content to the user computing device.

20. The non-transitory computer-readable medium of claim 15, wherein the logic further causes the remote computing device to monitor user actions on the dynamic content.

* * * * *